United States Patent
Li et al.

(10) Patent No.: US 8,644,274 B2
(45) Date of Patent: Feb. 4, 2014

(54) METHOD AND STRUCTURES FOR MOBILITY POLICY IN A WIMAX COMMUNICATIONS SYSTEM

(75) Inventors: Zexian Li, Espoo (FI); Roman Pichna, Espoo (FI); Ravi Shankar Pandey, Masala (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 12/600,097

(22) PCT Filed: May 15, 2008

(86) PCT No.: PCT/EP2008/055972
§ 371 (c)(1),
(2), (4) Date: Nov. 13, 2009

(87) PCT Pub. No.: WO2008/138969
PCT Pub. Date: Nov. 20, 2008

(65) Prior Publication Data
US 2011/0149926 A1    Jun. 23, 2011

(30) Foreign Application Priority Data
May 16, 2007 (EP) ..................... 07108326

(51) Int. Cl.
H04W 48/04 (2009.01)

(52) U.S. Cl.
USPC ........... 370/338; 370/331; 370/332; 370/334; 455/436; 455/437

(58) Field of Classification Search
USPC ......... 370/401, 332, 352, 410, 310, 328–331, 370/334
See application file for complete search history.

(56) References Cited

U.S. PATENT DOCUMENTS

| | | | |
|---|---|---|---|
| 5,905,950 A | 5/1999 | Anell | 455/421 |
| 7,554,942 B2* | 6/2009 | Joong et al. | 370/328 |
| 2001/0041569 A1* | 11/2001 | Rahman | 455/436 |
| 2006/0182061 A1* | 8/2006 | Naghian | 370/331 |
| 2006/0183461 A1* | 8/2006 | Pearce | 455/411 |
| 2006/0198347 A1* | 9/2006 | Hurtta et al. | 370/338 |
| 2006/0258354 A1* | 11/2006 | ul Haq | 455/436 |
| 2007/0064903 A1 | 3/2007 | Xiang | 379/202.01 |
| 2008/0108336 A1* | 5/2008 | Venkatachalum et al. | 455/414.3 |
| 2008/0139206 A1* | 6/2008 | Touray et al. | 455/437 |

FOREIGN PATENT DOCUMENTS

WO    WO 99/07167    2/1999

* cited by examiner

*Primary Examiner* — Andrew Chriss
*Assistant Examiner* — Mohamed Kamara
(74) *Attorney, Agent, or Firm* — Harrington & Smith

(57) ABSTRACT

The invention relates to method and structures for mobility policy e.g. in a Worldwide Interoperability for Microwave Access, WiMAX, based communication. According to embodiments, a method and devices for mobility control of a terminal are provided wherein a mobility policy parameter defines the mobility control of the terminal. The mobility policy parameter preferably is part of a mobility policy or subscription record stored for a subscriber of the terminal in a subscriber data base. The mobility policy parameter may include at least one of an indication of mobility restriction, possibly indicating included or excluded cells or areas etc; an indication of fixed access, indicating a fixed base station to which the subscriber has to request access; nomadicity, indicating that no handover is allowed for that particular subscriber; and restricted mobility limited to a group of base stations or areas. Embodiments allow to deploy mobile WiMAX for fixed access applications, enabling reuse of existing technology and further development towards full mobility.

13 Claims, 7 Drawing Sheets

METHOD AND STRUCTURES FOR MOBILITY POLICY IN A WIMAX COMMUNICATIONS SYSTEM

Figure 1:
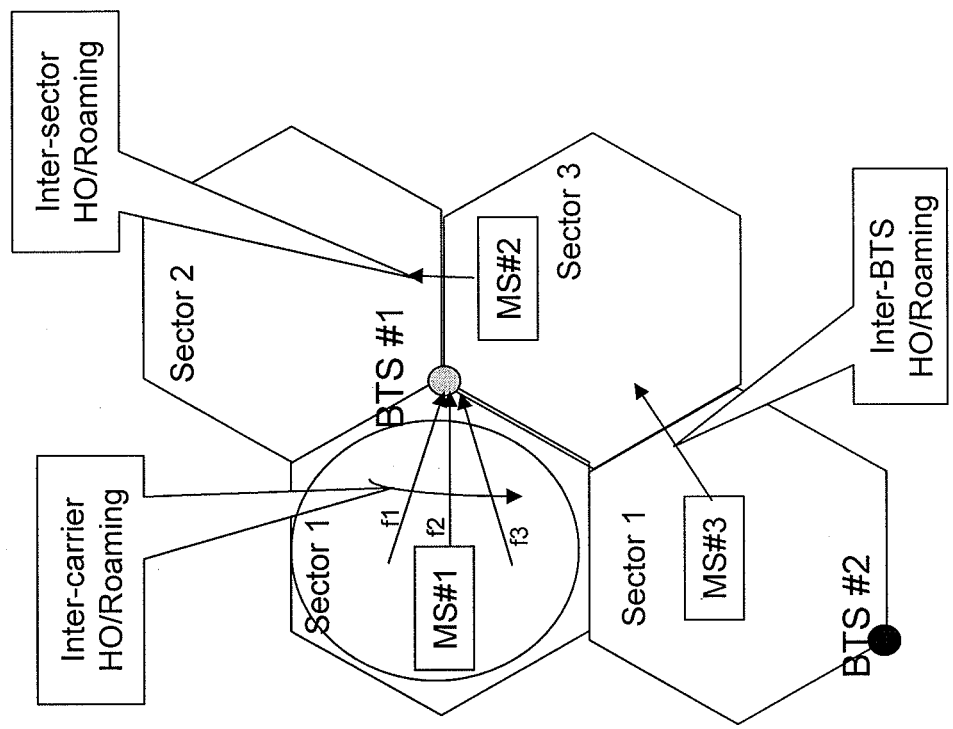

The invention relates to method and structures for mobility policy e.g. in a Worldwide Interoperability for Microwave Access, WiMAX, based communication.

Current mobile WiMAX, based on the standard IEEE 802.16e-2005, has been designed with inherent mobility support.

In accordance with at least one or all of the embodiments of the invention, it is an optional goal to deploy mobile WiMAX for fixed access applications, thus allowing to maximize the reuse of existing technology and keep a clear roadmap towards full mobility.

According to an embodiment, a method for mobility control of a terminal is provided, wherein a mobility policy parameter defines the mobility control of the terminal, the mobility policy parameter preferably being part of a mobility policy or subscription record stored for a subscriber of the terminal in a subscriber data base. The mobility policy parameter may include at least one of an indication of mobility restriction; an indication of fixed access, indicating a fixed base station to which the subscriber has to request access; nomadicity, indicating that no handover is allowed for that particular subscriber; and restricted mobility limited to a group of base stations or areas.

To identify the areas concerned, area identifiers have to be used. WiMAX Forum defines a base station identifier, BS ID, which does not scale up for larger areas and can not be used alone for restricting mobility. WiMAX Forum further defines a paging group, PG, identifier, ID, but reusing existing WiMAX PG ID does not scale down to several transceivers in a sector and base transceiver station, BTS, levels.

The terminal and/or an access network or access services network may be configured for communication based on mobile worldwide interoperability for microwave access, WiMAX. The mobility policy parameter can include, for defining a mobility restriction of the subscriber, at least one of base station identifiers; paging group identifiers; zone identifiers which comprise at least one of a list of paging group identifiers or base station identifiers, a list of base station identifiers for small zones, a list of paging group identifiers for large zones, a list of zone identifiers; or a list of base station identifiers/paging group identifiers/zone identifiers, wherein each identifier or list may optionally be accompanied by an indication indicating inclusion or exclusion of the respective base station, paging group or zone into or from e.g. an allowed network entry, handover, location update or mode change. The mobility policy parameter may be provisioned into a base station, and propagated to an access services network gateway; or a base station may announce its membership to zones of the mobility policy parameter to an access services network gateway in a discovery phase; or a network entry signaling may be augmented with paging group or zone identifiers. The mobility policy parameter can be provided by provisioning a zone/base station identifier mapping into at least one access services network gateway, and/or an authorization message may carry the mobility policy parameter. A mobility restriction may be enforced in at least one of the following procedures, network entry; idle/active transition; location update; or handover. A network entry of the terminal at a new location may trigger a hot-lining of the terminal to register a new address, street address or location. A terminal repetitively attempting access after being denied to a certain base station may be rejected at subscriber basic capability level such as subscriber basic capability level negotiation between the terminal and network. A network element can perform a policy check based on the mobility policy parameter when the terminal requests at least one of the following procedures, network entry; idle/active transition; location update; or handover. The network element may be a gateway or another entity of an access network or access services network, and can be adapted to store or retrieve a mobility policy parameter for a terminal, configured to perform a mobility policy check based on the mobility policy parameter when the terminal requests access or a change, and to decide on granting or denying the requested access or change depending on the mobility parameter. A computer program product may comprise program code means adapted to perform any of the above mentioned steps when the program is run on a computer or processor. A system can comprise a network element, a terminal and an access network, etc.

Embodiments of the invention allow to deploy a fixed wireless access network with mobile WiMAX and later provide mobility, e.g. in selected countries.

The current mobile WiMAX system may be deployed for stationary use cases e.g. for one or more of the following reasons: regulatory requirements tied to the frequency license; restrictions of the WiMAX bands in some countries to stationary terminals, especially at e.g. 3.5 GHz; commercial requirements; plans to charge premium for mobility; one or more operators selling only fixed access in subscribed geographical areas, e.g., home and office.

Figure 2:
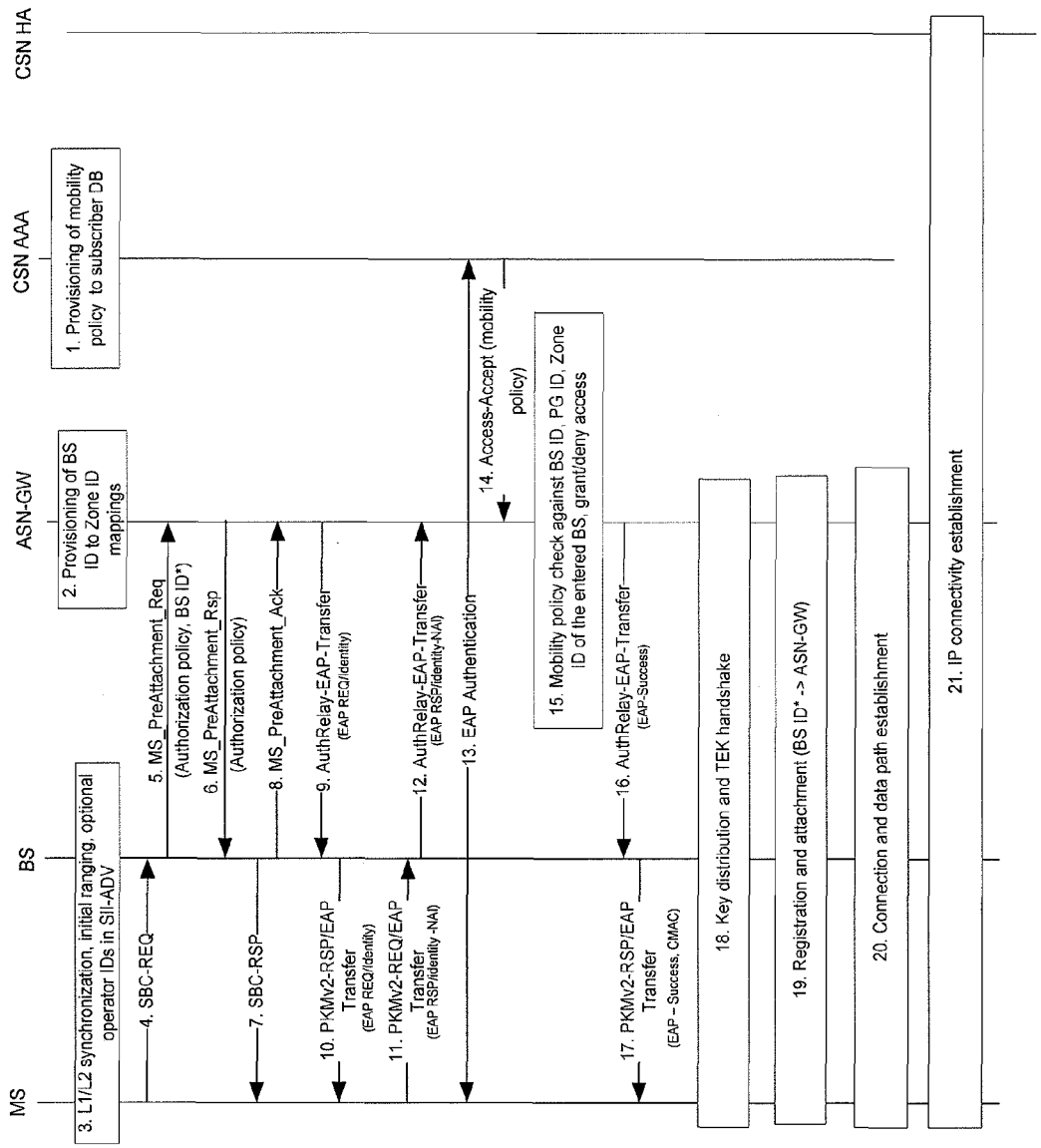
Figure 3:
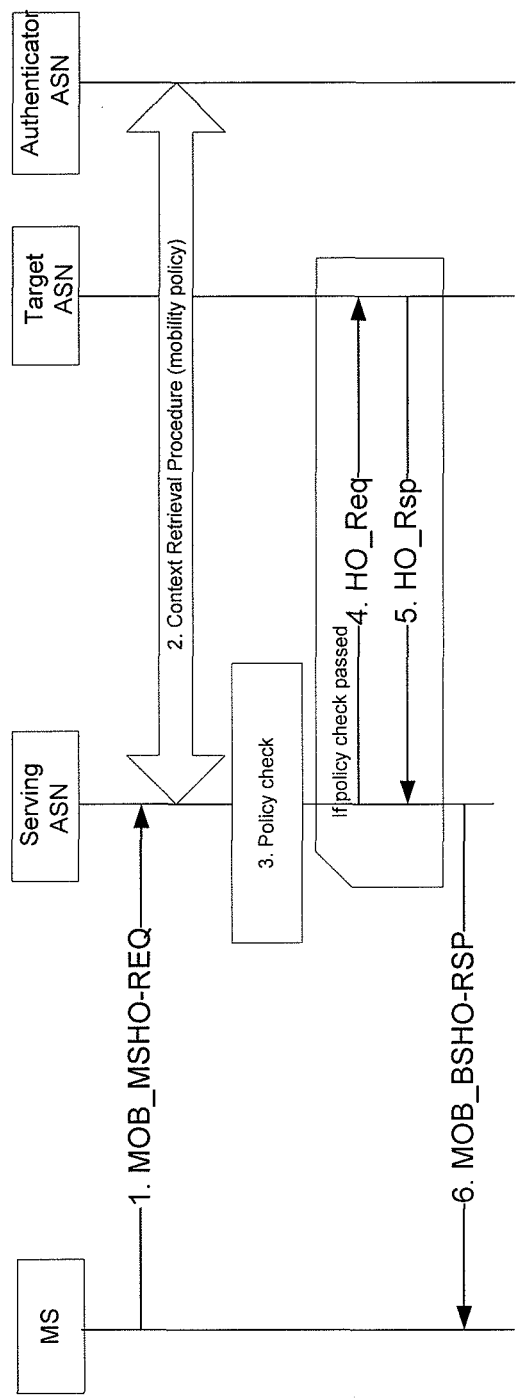
Figure 4:
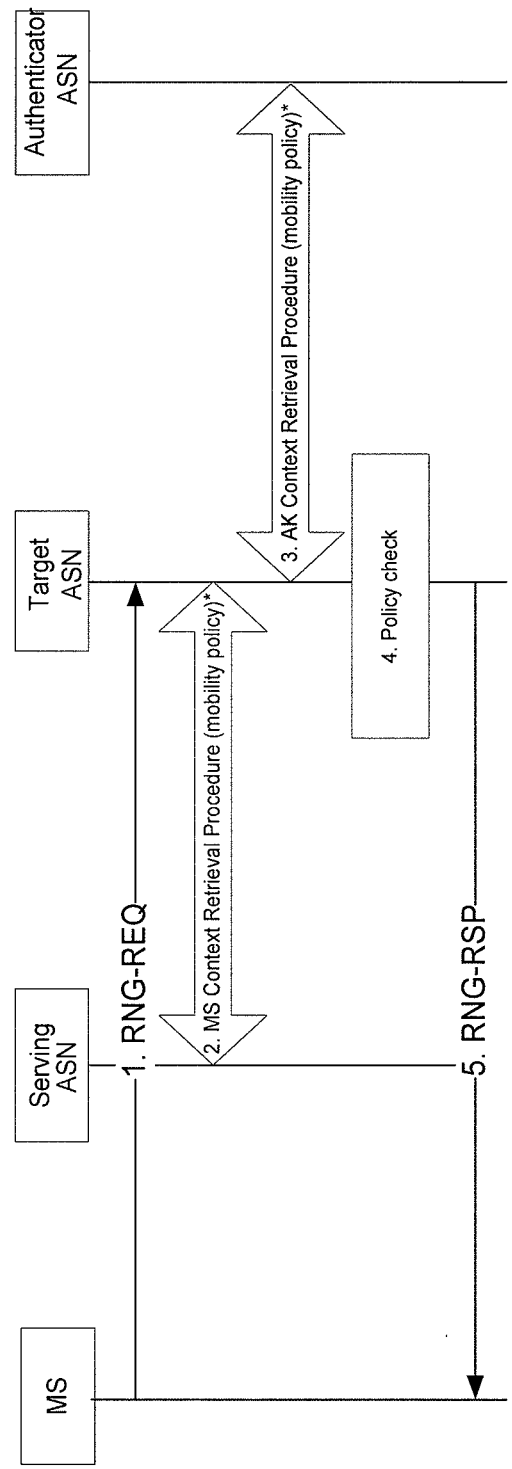
Figure 5:
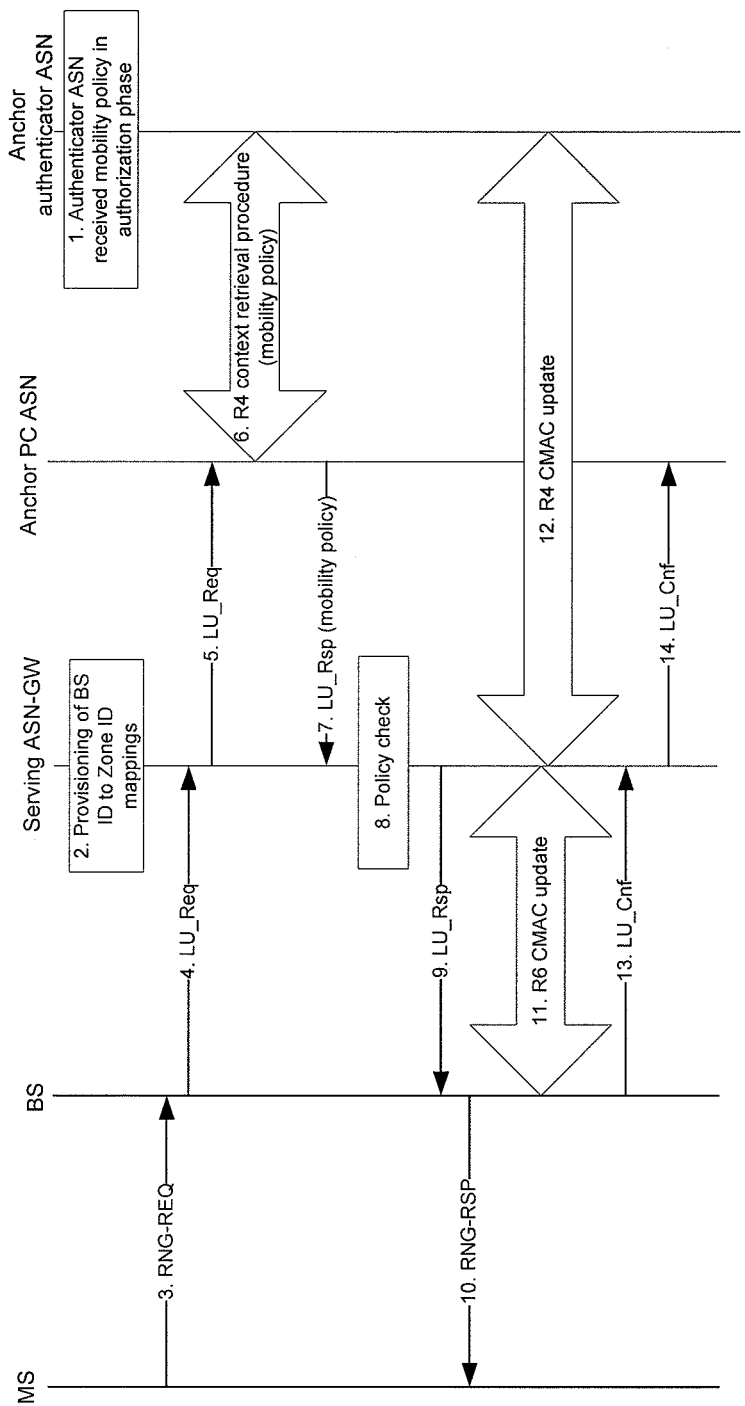
Figure 6:
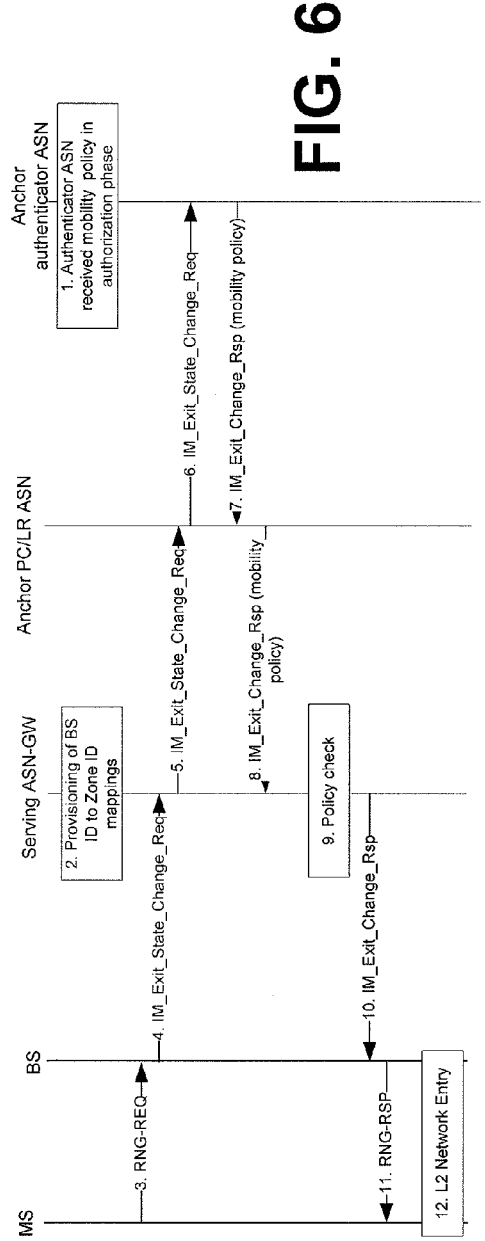
Figure 7:
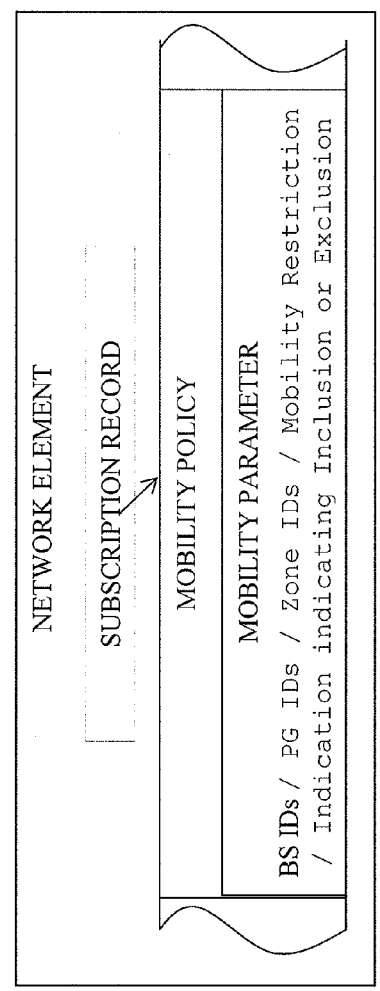
Figure 8:
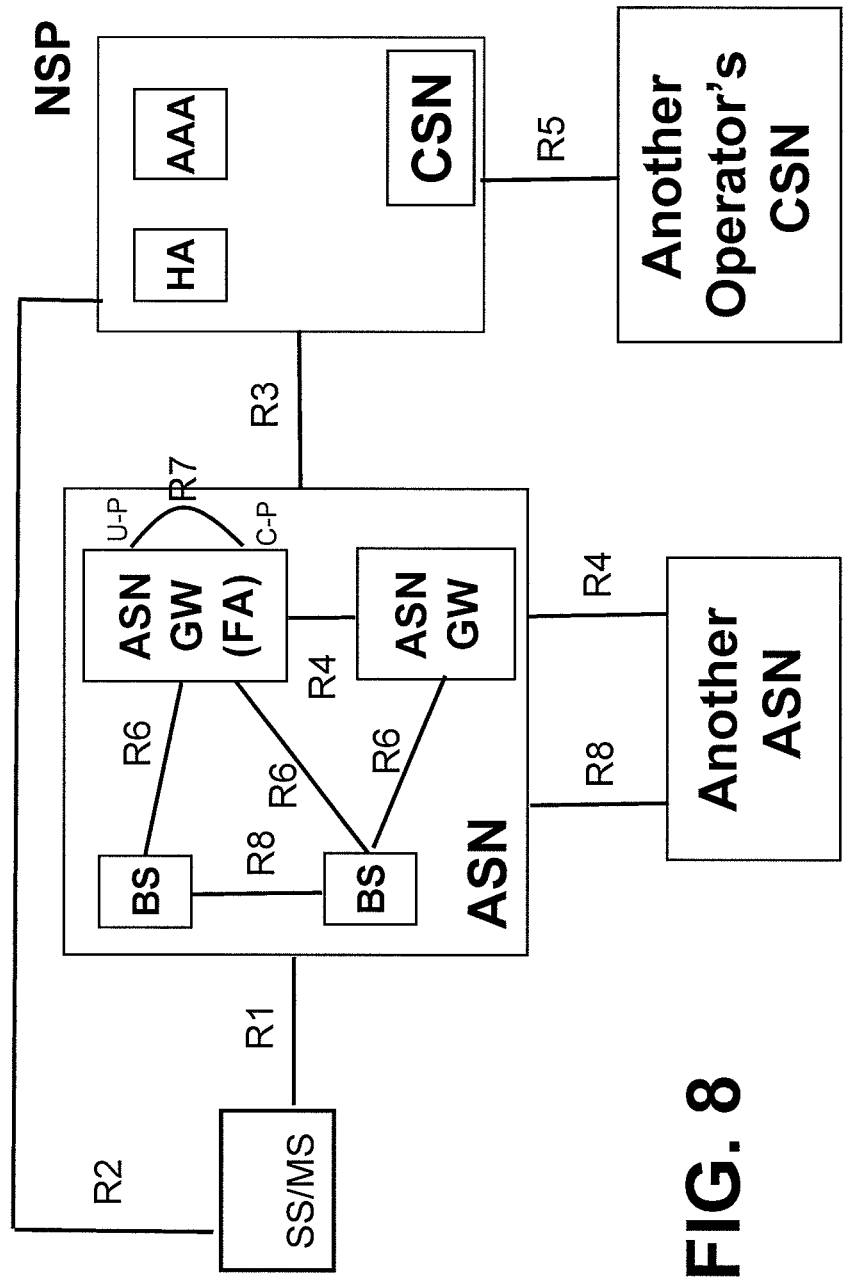

Embodiment of the invention will be described in the following with reference to the drawings which illustrate:

FIG. 1 an example of granularity of being static;

FIG. 2 an embodiment of a structure and method of a network entry procedure;

FIG. 3 an embodiment of a structure and method of a handover preparatory phase;

FIG. 4 an embodiment of a structure and method of an uncontrolled (un-predictive) handover;

FIG. 5 an embodiment of a structure and method of a location update;

FIG. 6 an embodiment of a structure and method of an idle mode exit;

FIG. 7 an embodiment of a structure of a subscription record in a network element; and FIG. 8 a basic structure of an example of a WiMAX architecture.

In the following, embodiments of the invention will be described.

As shown in FIG. 1, there are different scenarios for static/limited mobility deployment. The granularity of being static may include the following cases: a fixed case, a nomadic case without handover, and restricted mobility.

In the fixed case, the terminal is tied to one base station, BS. Initial network entry of the terminal is only allowed at one particular BASE STATION (carrier, transceiver) without mobility. The terminal may perhaps move around as long as it stays connected or attached to the base station for uplink or downlink traffic or signaling.

In this and any other embodiment, the terminal can be a mobile or stationary device such as a mobile phone, user equipment, mobile station, a computer such as a personal digital assistant, laptop, or any other type of communication device.

In a nomadic case, without handover, HO, the scenario is very much like a WiMAX or WLAN hotspot. In this scenario, initial network entry of the terminal is allowed to any base station but without handover (HO). No HO means suboptimal base station selection, possibility to increase inter-cell interference, and the terminal such as a mobile station MS is tied to one transceiver.

In the case of restricted mobility, the mobility is limited to a certain area or zone. Restricted mobility may comprise several sub-cases. HO/attachment may be allowed only within one sector, allowing load balancing for stationary terminals. As an alternative, HO/attachment may be allowed for all sectors of one BTS. The MS is still tied to only one site. This is to satisfy regulatory requirements and provide some mobility, and also advantageous for a MS at sector boundary. Alternatively, HO/attachment may be allowed for BSs in different BTSs within a (or more) predefined zone, a number of paging groups, etc. Examples are a cluster of BSs around home address, or regional access (cities e.g. in China, network entry at a group of BSs, mobility within the area). Complementary, a MS may also be excluded from certain zones, denying access of the MS to such zones. The mobility restriction thus may possibly indicate included (allowed) or excluded (forbidden) cells or areas etc.

This scenario is defined mainly for an operator who e.g. wants to restrict mobility of subscribers and sell fix access in different areas, e.g., office, home, hotspot etc. The granularity of restricting mobility might vary for different subscribers and can be provisioned into subscribers' database.

One or more of the following or other possible scenarios apply for mobility restriction. The fixed case is a special case in which the terminal is tied to one base station, BS. In another case, handover/attachment is allowed only within one sector having several transceivers/BSs. HO/attachment may be allowed for all sectors of one BTS. The terminal such as a MS is still tied to only one site. This can satisfy regulatory requirements and provide some mobility. HO/attachment may also be allowed for a set of BSs in different BTSs within a predefined zone, e.g., a number of paging groups. An example would be a cluster of base stations around home address, regional access (network entry at a group of base stations, mobility within the area) and complementary (MS excluded from certain zones).

When considering different architectures such as a BS-only deployment in which a BS+RADIUS Client may be coupled to interfaces to IP and R3aaa; or a distributed ASN-GW structure in which a BS+ASN-GW may be connected to a home agent via an interface R3mIP, and to a AAA server via an interface R3aaa; or a Full mobile WiMAX in which a BS is connected to a separate ASN-GW which ASN-GW is connected to a home agent via an interface R3mIP, and to a AAA server via an interface R3aaa; all these three architectures are not sufficient for static deployments because they are lacking mechanisms for restricting nomadicity/mobility. Embodiments of the present invention are able to provide solutions for all these three and other architectures.

FIG. 1 shows different stages of granularity, e.g. in stationary/static environments. In a case of inter-frequency carrier handover/roaming in sector 1, a terminal MS#1 switches between different frequencies f1, f2, f3 within the same sector 1. A BTS#1 covers sectors 1, 2, 3.

In a case of inter-sector handover/roaming as shown in FIG. 1, a MS#2 moves between different sectors, e.g. from sector 3 to sector 2, covered by the same BTS#1.

FIG. 1 further illustrates a case of inter-BTS handover/roaming in which a terminal MS#3 moves to a sector covered by a different base transceiver station, e.g. from sector 1 of BTS#2 to sector 3 of BTS#1.

Nomadicity and restricted mobility are orthogonal concepts. A (or more) subscriber can be limited to a certain area or zone but be allowed or denied HO.

Embodiments of the invention support use cases for static deployment. Thus, embodiments provide mobile WiMAX for stationary deployment.

Embodiments of the invention provide a Mobile WiMAX solution that allows configuring a subscriber mobility policy that may be stored in a subscriber database (e.g. as a new part of the subscriber record). A mobility restriction e.g. to fixed, nomadic or restricted mobility, is described via BS IDs, paging group (PG) IDs or via here proposed zone identifiers, Zone IDs which may be a list of PG IDs or BS IDs.

In order to support nomadicity, in one or more embodiments of the invention a mobility policy is stored in subscriber database as a new part of the subscription record. This mobility policy may include, in accordance with one, more or all of the embodiments of the invention, an indication of nomadicity, indicating that no handover, HO, is allowed for that particular subscriber.

In order to support restricted mobility, in accordance with one, more or all of the embodiments of the invention, one or more of the following additional mobility policy parameters can be used and stored in a subscriber database as a part of a subscription record: a list of BS IDs for small zones; a list of PG IDs, for big zones; a list of Zone IDs (a zone can include a list of PG IDs and/or BS IDs, each base station, BS has to be, and is, allocated to which zones it belongs); or a list of BS/PG/zone IDs which is accompanied with inclusion or exclusion indication.

A provisioning of zone IDs can be done e.g. in the following two ways.

A list of zones for base station is provisioned into the base station together with PG ID. The information can be propagated to an access service network gateway, ASN-GW, over the interface R6 between BS and ASN-GW; or a base station, BS announces the membership in zones to ASN-GW in ASN-GW discovery phase (piggybacked on resiliency or load sharing signaling); or a network entry signaling over R6 is augmented with PG/zone IDs (BS ID is known to ASN-GW).

As an alternative or additionally, zone-BS ID mapping may be provisioned into ASN-GWs.

Provisioning of the subscriber mobility policy can be implemented e.g. in a static or dynamic way. In the static way, the subscriber mobility policy can be pre-provisioned into the base station or ASN-GW via Operations and Management, O&M, with MS IDs or network access identifiers NAIs and related BS/PG/zone IDs. This implies no new requirements on the interface R3 between ASN and CSN, enabling vendors-interoperable ASN/CSN interface. In the dynamic way, an authorization message optionally carries the mobility policy parameters. In that case, new R3 AAA TLVs (type/length/value) or messages are provided.

A mobility restriction can or shall be enforced e.g. in one or more of the following procedures such as network entry (including idle/active transition); location update; or handover, HO, or uncontrolled HO.

In addition, further novel optional procedures are disclosed which may be used alone or in arbitrary combinations with the other features of one, more or all of the embodiments of the invention. Network entry at a new location may trigger MS hot-lining to register a new street address/location. Hot-lining may include a process of diverting a subscriber from her desired destination to a destination controlled by a service provider. Hotlining may be based on a specific circumstance or parameter associated with a subscriber.

For a terminal repetitively attempting access after being denied to a certain BS, the terminal is optionally rejected at subscriber basic capability, SBC, level, such as subscriber basic capability level negotiation between the terminal and network, to reduce the load on BS (BS internal procedure).

Details for mobility restriction enforcement are described below.

FIG. 2 illustrates an embodiment of a method and structure of a network entry procedure. In FIG. 2, among others, the content of features or steps 1, 2, 14, 15 includes novel matter.

The procedure and structure of the embodiment of FIG. 2 constraint the new features into access service network gateway, ASN-GW, and authentication, authorization and accounting, AAA.

FIG. 2 shows process flows, structures and messages in accordance with one or more embodiments of the invention, including a terminal MS (e.g. mobile station), a base station BS, an gateway ASN-GW of an access services network, ASN, an authentication, authorization and accounting, AAA, server or function CSN-AAA of a connectivity service network, CSN, and a home agent, HA, of the connectivity service network, CSN.

The embodiment of FIG. 2 includes a step or function 1 of provisioning of mobility policy to a subscriber database, DB, in which a mobility policy for one or more subscribers is stored in the subscriber database. The subscriber database may be stored in any appropriate part or device of, or accessible to, the connectivity service network.

Further, a step or function 2 of FIG. 2 provides provisioning of BS ID to Zone ID mappings in which base station identifiers are mapped to zone identifiers so as to define which base stations are assigned to which zones, and the mapping is stored in the gateway.

After the steps 3 to 12 shown in FIG. 2 with pre-attachment, authentication relay etc as shown, an extensible authentication protocol, EAP, authentication is carried out in step 13. Then, in step 14, the server CSN-AAA confirms acceptance by sending an access accept message to the gateway ASN-GW. This access accept message includes the mobility policy so as to inform the gateway ASN-GW on the mobility policy applicable to the accepted terminal. The gateway may store the mobility policy and use it in step 15, mobility policy check against base station identifier, BS ID, paging group identifier PG ID, zone identifier, Zone ID, of an entered BS e.g. when the terminal is roaming, and decides on granting or denying access of the terminal to certain base stations, zones or groups.

In steps 5 and 19, the base station identifier is sent as a mandatory part of the messages.

Signals from step 16 of FIG. 2 show the success case with registration, connection, data path and IP connectivity establishment.

For a terminal outside the restricted area, steps 16 and 17 carry the "failure" information.

For failed access attempts outside of the restricted zone, a device or function such as ASN-GW keeps the subscription mobility policy to MS ID mapping for a certain or defined time. Based on this information, ASN-GW can reject repetitive access attempts already in SBC request phase, steps 4 to 7 of FIG. 2, e.g. by sending a negative response 7 to a SBC request of step 4. The gateway checks the base station identifier included in the pre-attachment request 5 sent from the base station BS to the gateway ASN GW and compares it to the list of base stations allowed or forbidden for the terminal.

This embodiment may require modifications to interface R3aaa but not to interface R6.

In FIG. 2, the signals having an added asterisk, BS ID*, indicate that in these signals BS ID is mandatory for this signaling exchange.

FIG. 3 shows another embodiment in accordance with the invention, dealing with a preparatory phase of handover. In this embodiment, the decision as to allow or reject a handover request is made in the serving ASN-GW. The embodiment may provide an extension of R4 signaling.

In the embodiment of FIG. 3, a terminal MS sends a handover request MOB_MSHO-REQ to the serving access services network in a step 1. The access services network performs, in step 2, a context retrieval procedure with an authenticator access services network and receives the mobility policy stored for the subscriber of the handover-requesting terminal.

In a step 3, the serving ASN carries out a policy check based on the received mobility policy for deciding on acceptance of the handover request. When the policy check is successfully passed, i.e. the mobility policy stored for the requesting subscriber allows the intended handover, steps 4, 5 and 6 are performed. In step 4, the serving ASN sends a handover request to the target ASN which returns a handover response in step 5, confirming the requested handover. Upon receipt of the response of step 5, the serving ASN sends a handover response MOB_BSHO-RSP to the terminal in step 6, confirming the requested handover of step 1. Thereupon, the actual handover can be initiated.

If the policy check of step 3 fails, signals 4 and 5 will not be sent, and the requested handover will not be allowed.

Note that all variants of HO preparatory phase as defined in WiMAX Forum (WMF), Stage 3 can be modified in a similar way.

In FIG. 3, among others, the content of features or steps 2, 3 includes novel matter.

FIG. 4 shows another embodiment in accordance with the invention, dealing with a case of uncontrolled or unpredictive handover. In this embodiment, the decision as to allow or reject a handover request is made in the target gateway ASN-GW to which the connection is to be handed over. This embodiment may provide an extension of R4 signaling.

In the embodiment of FIG. 4, a terminal MS sends a handover request or ranging request RNG-REQ to a target access services network, Target ASN, in step 1. The target access services network performs, in step 2, a context retrieval procedure with the serving access services network and receives the mobility policy stored for the subscriber of the handover-requesting terminal as part of this procedure from the serving access services network. Additionally, or alternatively, the target access services network may perform, in step 3, a context retrieval procedure with the authenticator access services network and may receive the mobility policy as part of this procedure from the authenticator access services network.

In a step 4, the target access services network carries out a policy check based on the received mobility policy for deciding on acceptance of the handover request. When the policy check is successfully passed, i.e. the mobility policy stored for the requesting subscriber allows the intended handover, step 5 is performed in which the target access services network sends a handover response to the terminal, confirming the requested handover.

If the policy check of step 4 fails, the response of step 5 will not be sent, and the requested handover will not be allowed.

Note that all variants of uncontrolled handover as defined in WiMAX Forum (WMF), Stage 3 can be modified in a similar way.

In FIG. 4, among others, the content of features or steps 2, 3, 4 includes novel matter.

FIG. 5 shows another embodiment in accordance with the invention, dealing with a case of location update. This embodiment may provide an extension of R4 signaling.

In the embodiment of FIG. 5, an anchor paging controller access services network, Anchor PC ASN, and an anchor authenticator access services network, Anchor authenticator ASN, are shown in addition to the mobile station or terminal MS, the base station BS, and the serving access services network gateway, Serving ASN-GW.

The embodiment of FIG. 5 includes a step or function 1 in which the anchor authenticator access services network receives or has received the mobility policy for the terminal MS in the authorization phase. The mobility policy may also have been stored in the anchor authenticator access services network at another time such as at an earlier authorization.

Further, similar to step 2 of the embodiment of FIG. 2, a step or function 2 of FIG. 5 provides provisioning of BS ID to Zone ID mappings in which base station identifiers are mapped to zone identifiers so as to define which base stations are assigned to which zones, and the mapping is stored in the serving ASN gateway.

In the embodiment of FIG. 5, the terminal MS sends in step 3, a ranging request RNG-REQ to the base station BS. The base station sends a location update request to the serving access services network gateway, in step 4, which forwards the location update request to the anchor pc access services network, step 5. The anchor pc access services network performs, in step 6, a R4 context retrieval procedure with the anchor authenticator access services network and receives the mobility policy stored for the subscriber of the ranging request originating terminal as part of this procedure from the anchor authenticator access services network.

In step 7, the anchor pc access services network returns a location update response to the serving access services network gateway, step 7, which response includes the mobility policy received in step 6. The serving access services network gateway performs a policy check in step 8 for checking whether the mobility policy of the terminal allows or forbids the requested ranging or location update. When the policy check of step 8 is successfully passed, the serving access services network gateway sends a location update response to the base station in step 9, confirming the location update. The base station sends a ranging response to the terminal in step 10, accepting the ranging request.

In steps 11, 12, R6 CMAC (Cipher-based Message Authentication Code) and R4 CMAC update procedures are carried out between the base station, the serving access services network gateway and the anchor PC access services network, as shown in FIG. 5.

In steps 13, 14, location update confirmations are sent to the serving access services network gateway and anchor pc access services network, as shown. In the embodiment of FIG. 5, an extension of R4 signalling is provided.

In FIG. 5, among others, the content of features or steps 1, 2, 6, 8 includes novel matter. When the mobility check of step 8 fails, the ranging request and location updates are rejected.

FIG. 6 shows another embodiment in accordance with the invention, dealing with a case of exiting an idle mode. This embodiment may provide an extension of R4 signaling.

In the embodiment of FIG. 6, an anchor Paging Controller/ Location Register, PC/LR access services network, Anchor PC/LR ASN, and an anchor authenticator access services network, Anchor authenticator ASN, are shown in addition to the mobile station or terminal MS, the base station BS, and the serving access services network gateway, Serving ASN-GW.

The embodiment of FIG. 6 includes, similar to the embodiment of FIG. 5, a step or function 1 in which the anchor authenticator access services network receives or has received the mobility policy for the terminal MS in the authorization phase. The mobility policy may also have been stored in the anchor authenticator access services network at another time such as at an earlier authorization.

Further, similar to step 2 of the embodiments of FIGS. 2, 5, a step or function 2 of FIG. 6 provides provisioning of BS ID to Zone ID mappings in which base station identifiers are mapped to zone identifiers so as to define which base stations are assigned to which zones, and the mapping is stored in the serving ASN gateway.

In the embodiment of FIG. 6, the terminal MS sends in step 3, a ranging request RNG-REQ to the base station BS. The base station sends an idle mode exit state change request to the serving access services network gateway, in step 4, which forwards this request to the anchor PC/LR access services network, step 5. The anchor PC/LR access services network forwards this request, in step 6, to the anchor authenticator access services network which returns, in step 7, an idle mode exit state change response to the anchor PC/LR access services network. The idle mode exit state change response sent from the anchor authenticator access services network to the anchor PC/LR access services network includes the mobility policy stored in the anchor authenticator access services network for the terminal MS.

In step 8, the anchor PC/LR access services network forwards the received idle mode exit state change response to the serving access services network gateway, including the mobility policy, received in step V. The serving access services network gateway performs a policy check in step 9 for checking whether the mobility policy of the terminal allows or forbids the requested idle mode exit. When the mobility check of step 9 is successfully passed, the serving access services network gateway sends a idle mode exit change response to the base station in step 10, confirming the requested idle mode exit. The base station sends a ranging response to the terminal in step 11, accepting the idle mode change.

In step 12, a Layer 2 network entry, L2 Network Entry, procedure is carried out between the terminal and the base station, as shown in FIG. 6.

In the embodiment of FIG. 6, an extension of R4 signalling is provided.

When the policy check of step 9 fails, the ranging response RNG-RSP of step 11 will indicate failure and step 12 will not be executed.

FIG. 7 shows an embodiment of a structure of a subscription record stored in a network element. The network element such as a data base or subscription record storage includes one or more subscription records for subscribers, the subscription records including a mobility policy part and further information for the respective subscribers. The mobility policy part comprises the mobility parameter or parameters such as BS IDs/PG IDs/Zone IDs/Mobility Restriction/Indication indicating Inclusion or Exclusion.

In the following, examples of the identifiers are described. The base station identifier BS ID may have 48 bits. The paging group identifier PG ID may consist of 16 bits. The zone identifier Zone ID may include a list of zero or more base station identifiers BS IDs, and/or a list of zero or more paging group identifiers PG IDs.

A zone ID can be interpreted as at least one of, or an arbitrary combination of:
a group of PG IDs covering a city; a cell cluster identifier, ID (which may be smaller than a paging group, PG, and flexible; a site identifier (geographical significance); and a sector identifier (geographical significance).

FIG. 8 shows an example of a WiMAX architecture to which the above features and embodiments of the invention may be applied. A mobile station MS or SS may communicate with an access service(s) network ASN via an interface R1. The access service(s) network may include one or more base stations BS and one or more access services network gateways ASN-GW which may act as a foreign agent FA. The access services network ASN may communicate with another access services network via interfaces R4, R8, and with a connectivity service network CSN of a network service provider NSP via interface R3. The connectivity service network CSN of the network service provider NSP further includes a home agent HA and a function, module, device for authentication, authorization and accounting, AAA. The connectivity service network CSN of the network service provider NSP may communicate with another connectivity service network CSN of another operator via interface R5.

Further, in accordance with at least one or all of the embodiments of the invention, a computer program product is provided which is adapted to carry out any of the steps or functions when run on a computer or processor.

The sequence and content of the steps or functions shown in the drawings is only an example and may also be exchanged or altered, or combined, in any arbitrary manner.

The actual mobility policy and policy check can be used in and for any examples of all variants of the relevant procedures, such as mobility, location update, network entry, etc.

The invention claimed is:

1. A method for mobility control of a terminal, wherein a mobility policy parameter is provided which defines the mobility control of the terminal, the mobility policy parameter being part of a mobility policy or subscription record stored for a subscriber of the terminal in a subscriber data base;
    wherein the mobility policy parameter includes an indication of mobility restriction,
    wherein the mobility policy parameter is configurable to represent each of three different cases including:
        a fixed case, in which the terminal is tied to one fixed base station for network entry and no handover is allowed,
        a nomadic case without handover, in which network entry of the terminal is allowed to any base station and no handover is allowed, and
        a restricted mobility case, in which network entry and mobility of the terminal are limited to a group of base stations representing a certain area or zone;
    wherein the nomadic case is orthogonal to the restricted mobility case such that the handover is allowed or disallowed, independently of whether or not the network entry and mobility are limited to the group of base stations representing the certain area or zone; and
    wherein a network element performs a policy check based on the mobility policy parameter when the terminal requests at least one of the procedures of network entry, idle/active transition, location update, or handover;
    wherein the mobility policy parameter includes, for defining a mobility restriction of the subscriber, at least one of:
        a base station identifier,
        a paging group identifier,
        a zone identifier which comprises a list of at least one said paging group identifier or one said base station identifier,
        a list of base station identifiers for small zones,
        a list of paging group identifiers for large zones,
        a list of zone identifiers; or
        a list of base station identifiers/paging group identifiers/zone identifiers,
        wherein each identifier or list is accompanied by an indication indicating inclusion or exclusion of the respective base station, paging group or zone into or from an allowed network entry, handover, location update or mode change.

2. A method according to claim 1, wherein the terminal and an access network or access services network are configured for communication based on mobile worldwide interoperability for microwave access, WiMAX.

3. A method according to claim 1, wherein the mobility policy parameter is provisioned into a base station, and is propagated to an access services network gateway; or a base station announces its membership to zones of the mobility policy parameter to an access services network gateway in a discovery phase; or a network entry signaling is augmented with paging group or zone identifiers.

4. A method according to claim 1, wherein the mobility policy parameter is provided by provisioning a zone/base station identifier mapping into at least one access services network gateway.

5. A method according to claim 1, wherein an authorization message carries the mobility policy parameter.

6. A method according to claim 1, wherein a mobility restriction is enforced in at least one of the following procedures, network entry; idle/active transition; location update; or handover.

7. A method according to claim 1, wherein a network entry of the terminal at a new location triggers a hot-lining of the terminal to register a new address, street address or location.

8. A method according to claim 1, wherein a terminal repetitively attempting access after being denied to a certain base station is rejected at subscriber basic capability level negotiation between the terminal and network.

9. A method according to claim 1, wherein the network element is a gateway or another entity of an access network or access services network.

10. A network element comprising at least one processor and at least one memory including computer program code, the at least one memory and the computer program code configured to, with the at least one processor, cause the network element to at least perform:
    storing or retrieving a mobility policy parameter for a terminal,
    checking a mobility policy based on the mobility policy parameter when the terminal requests access or a change, and
    deciding on granting or denying the requested access or change depending on the mobility parameter;
    wherein the mobility policy parameter includes an indication of mobility restriction,
    wherein the mobility policy parameter is configurable to represent each of three different cases including:
        a fixed case, in which the terminal is tied to one fixed base station for network entry and no handover is allowed,
        a nomadic case without handover, in which network entry of the terminal is allowed to any base station and no handover is allowed, and
        a restricted mobility case, in which network entry and mobility of the terminal are limited to a group of base stations representing a certain area or zone;
    wherein the nomadic case is orthogonal to the restricted mobility case such that the handover is allowed or disallowed, independently of whether or not the network entry and mobility are limited to the group of base stations representing the certain area or zone; and wherein the network element is adapted to perform a policy check based on the mobility policy parameter when the terminal requests at least one of the procedures of network entry, idle/active transition, location update, or handover;

wherein the mobility policy parameter includes, for defining a mobility restriction of the terminal, at least one of:

a base station identifier, a paging group identifier, a zone identifier which comprises a list of at least one said paging group identifier or one said base station identifier, a list of base station identifiers for small zones, a list of paging group identifiers for large zones, a list of zone identifiers; or a list of base station identifiers/paging group identifiers/zone identifiers, wherein each identifier or list is accompanied by an indication indicating inclusion or exclusion of the respective base station, paging group or zone into or from an allowed network entry, handover, location update or mode change.

11. A network element according to claim 10, wherein the network element is a gateway or another entity of an access network or access services network.

12. A computer program product comprising a computer-readable memory having program code stored thereon for execution by a processor, wherein the program code is adapted to perform any of the steps of claim 1 when the program is run on the processor.

13. A system comprising a network element of claim 10, a terminal and a network.

* * * * *

UNITED STATES PATENT AND TRADEMARK OFFICE
CERTIFICATE OF CORRECTION

PATENT NO. : 8,644,274 B2
APPLICATION NO. : 12/600097
DATED : February 4, 2014
INVENTOR(S) : Li et al.

It is certified that error appears in the above-identified patent and that said Letters Patent is hereby corrected as shown below:

Title Page, Item (73): Assignee should read as follows:
NOKIA SIEMENS NETWORKS OY, ESPOO (FI).

Signed and Sealed this
Fifth Day of August, 2014

Michelle K. Lee
*Deputy Director of the United States Patent and Trademark Office*